United States Patent [19]

Shinohara

[11] Patent Number: 4,671,627

[45] Date of Patent: Jun. 9, 1987

[54] GAUSSIAN LENS

[75] Inventor: Hiroichi Shinohara, Yokohama, Japan

[73] Assignee: Ricoh Company, Ltd., Tokyo, Japan

[21] Appl. No.: 785,524

[22] Filed: Oct. 8, 1985

[30] Foreign Application Priority Data

Oct. 8, 1984 [JP] Japan ................... 59-211085

[51] Int. Cl.⁴ .................. G02B 9/36; G02B 11/26
[52] U.S. Cl. ............................................. 350/471
[58] Field of Search .......................... 350/471, 470

[56] References Cited

U.S. PATENT DOCUMENTS

| 2,600,207 | 6/1952 | Cook | 350/471 |
| 2,834,253 | 5/1958 | Ito | 350/471 |

FOREIGN PATENT DOCUMENTS

| 678838 | 9/1952 | United Kingdom | 350/471 |

*Primary Examiner*—John K. Corbin
*Assistant Examiner*—Scott J. Sugarman
*Attorney, Agent, or Firm*—Oblon, Fisher, Spivak, McClelland & Maier

[57] ABSTRACT

A high resolving power Gaussian lens used for a facsimile or the like which uses high-density solid image forming elements. To achieve this object, it is necessary to maintain a high resolving power to cover the marginal portion of the image plane. In the Gaussian lens comprising four groups of lenses and being symmetrical to a diaphragm, each lens group comprises a cemented lens composed of a positive meniscus lens with a concave surface directed toward the diaphragm and a negative meniscus lens. The positive lens has a refractive index in excess of 1.74 to flatten an image surface. The second lens group and the third lens group are reduced in thickness to make it possible to have a wider angle.

4 Claims, 6 Drawing Figures

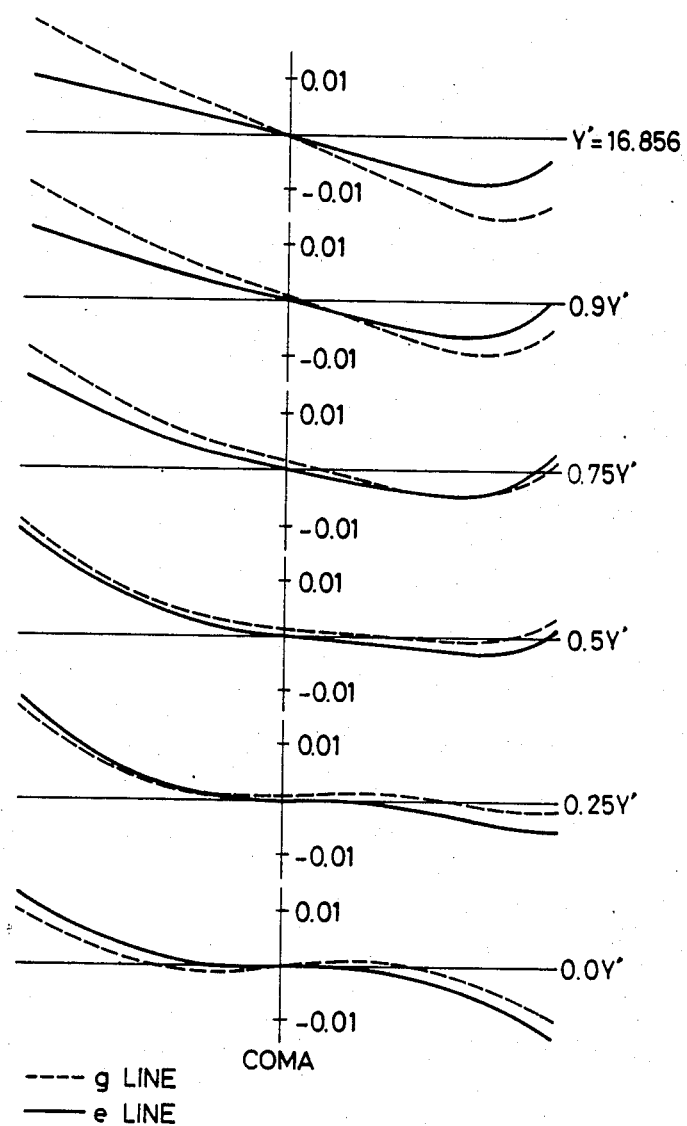

GAUSSIAN LENS

BACKGROUND OF THE INVENTION

1. Field of the Invention

The present invention relates to a lens system in facsimiles and copying machines, and more specifically, to a Gaussian lens comprising four groups including six lenses.

2. Description of the Prior Art

Recently, a high-density solid image forming element has been developed for putting it to practical use. For example, suppose that a solid image forming element of 7 μm is used, a resolving power of 71.4 lines/mm is required at the image surface. Thus, it is quite difficult to maintain a level of the same high performance from the center to the marginal portion.

If, for practical use, an attempt is made to decrease a synthesized thickness of the second and third lens groups of the Gaussian lens comprising four groups including six lenses, there occurs two problems. One problem is that the Petzval's sum increases, and the other is that a thickness of a lens side of a positive lens system decreases to fail to secure brightness and an angle of view, and so, if an absolute value of a radius of curvature of a cemented surface is intended to be reduced, chromatic aberration is turned negative.

Prior art lenses comprising four groups including eight lenses are disclosed, for example, in U.K. Pat. Nos. 658,349 and 678,838. However, these patents have a problem that the aberration amount is large, failing to be a high performance lens.

SUMMARY OF THE INVENTION

The present invention has been achieved in an attempt to solve the above-described difficulties. It is an object of the present invention to provide a Gaussian lens in which the first group and the fourth group in a Gaussian lens system comprise cemented lenses, and an angle of view is above 20° and the Petzval's sum and the chromatic aberration are well compensated for.

To achieve the aforesaid object, the present invention provides a high-density Gaussian lens in the form of a symmetrical type lens comprising four groups including eight lenses, said four groups consisting of a first lens group which is a cemented lens comprising a negative meniscus lens with a convex surface directed toward an object and a positive meniscus lens with a convex surface directed toward an object, a second lens group which is a cemented lens comprising a third positive meniscus lens with a convex surface directed toward an object and a fourth negative meniscus lens with a convex surface directed toward an object, a third lens group which is a cemented lens comprising a fifth negative meniscus lens with a convex surface directed toward an image and a sixth positive meniscus lens with a convex surface directed toward an image, and a fourth lens group which is a cemented lens comprising a positive meniscus lens with a convex surface directed toward an image and a negative meniscus lens, said first lens group and fourth group lens and said second lens group and third lens group being arranged symmetrically around the diaphragm, said Gaussian lens being satisfied with the following conditional formula:

$$\frac{nI + n3 + n6 + nIV}{4} > 1.74 \quad (1)$$

$$\nu I, \nu 3, \nu 6, \nu IV > 48.0 \quad (2)$$

$$0.25f < r5 < 0.45f \quad (3)$$

$$0.35f < |r9| < 0.65f$$

$$d4 + d5, d8 + d9 < 0.075f \quad (4)$$

$$0.28 < \frac{d4 + d5}{d1 + d2} < 0.48 \quad (5)$$

where $nI$, $nIV$ are the refractive indices of positive lenses of the first and fourth groups, respectively; $n3$, $n6$ are the refractive indices of the third and six lenses, respectively; $\nu I$, $\nu IV$ are the Abbe number of positive lenses of the first and fourth lens group, respectively, and $\nu 3$, $\nu 6$ are the Abbe number of the third lens and six lens, respectively.

Next, the contents of the aforementioned conditions will be described in detail.

In the condition (1), to achieve the high performance, namely, to decrease the curve of the image suface, the Petzval's sum has to be decreased and the refractive index over 1.74 is required.

The condition (2) is required to compensate for the chromatic aberration of magnification. The greater the value, the better. When the value exceeds the lower limit, compensation is impossible to make.

The condition (3) is required to make thinner a synthesized thickness of the second group and the third group similar to the condition (4) to have a wider angle. When the value exceeds the lower limit, the chromatic aberration is negative and great. If a sheet of glass having a small Abbe number is used in the negative lens system to compensate for the chromatic aberration, the Petzval's sum increases, and it is not possible to make the curvature of an image surface small. When the value exceeds the upper limit, it is not possible to make the synthesized thickness thin, thus failing to provide a wider angle.

Moreover, the thickness in the marginal portion of the lens decreases to make it impossible to perform processing. Therefore, it is not possible to make F number small and to make aperture efficient great.

The condition (4) is required to make an angle of view large. When the value exceeds the value in said condition, the performance over 20° of half-angle of view cannot be obtained satisfactorily.

In the condition (5), when the value exceeds the upper limit in the range of the condition (4) in connection with the condition (4), the curve of the image surface is great, and sagital and meridional and astigmatism are not in coincidence and an astigmatic difference increases. When the value exceeds the lower limit, the chromatic aberration of magnification increases and compensation at other places becomes difficult to make.

BRIEF DESCRIPTION OF THE DRAWINGS

FIG. 6 is a comatic aberration curve.

DETAILED DESCRIPTION OF THE PREFERRED EMBODIMENTS

Embodiments of the present invention will be given below. Symbols used herein are as follows:

f: synthesized focal length of lens system (e line)
m: magnification
ω: half-angle of view
r: radius of curvature
d: distance between the lens surfaces
n: refractive index of glass (d line)
ν: Abbe number of glass (d line).

TABLE 1

| r | | d | | n | | ν | |
|---|---|---|---|---|---|---|---|
| r | ∞ | d | 5.00 | n | 1.51633 | ν | 64.1 |
| r' | ∞ | d' | 375.952 | | | | |
| r1 | 18.950 | d1 | 1.50 | nI | 1.63980 | νI | 34.5 |
| r2 | 13.702 | d2 | 5.60 | nI | 1.75500 | νI | 52.3 |
| r3 | 35.146 | d3 | 0.13 | | | | |
| r4 | 11.298 | d4 | 1.80 | n3 | 1.77250 | ν3 | 49.6 |
| r5 | 13.560 | d5 | 0.90 | n4 | 1.71736 | ν4 | 29.5 |
| r6 | 8.129 | d6 | 4.90 | | | | |
| r7 | ∞ (diaghragm) | d7 | 4.90 | | | | |
| r8 | −10.382 | d8 | 0.90 | n5 | 1.63980 | ν5 | 34.5 |
| r9 | −17.918 | d9 | 1.60 | n6 | 1.75500 | ν6 | 52.3 |
| r10 | −14.613 | d10 | 0.13 | | | | |
| r11 | −87.155 | d11 | 5.00 | nIV | 1.75500 | νIV | 52.3 |
| r12 | −13.560 | d12 | 1.50 | n8 | 1.63980 | ν8 | 34.5 |
| r13 | −21.095 | d13 | 23.757 | | | | |
| r14 | ∞ | d14 | 0.70 | n9 | 1.51633 | ν9 | 64.1 |
| r15 | ∞ | | | | | | |

The Table 1 indicates data in the first embodiment based on numerical values of the present invention. These numerical values are based when aperture ratio is 1:4.0, half-angle of view is 20.7°, synthetized focal length of lens system is 40.08 mm, and magnification is −0.112.

TABLE 2

| r | | d | | n | | ν | |
|---|---|---|---|---|---|---|---|
| r | ∞ | d | 5.00 | n | 1.51633 | ν | 64.1 |
| r' | ∞ | d' | 374.918 | | | | |
| r1 | 18.500 | d1 | 5.90 | nI | 1.75500 | νI | 52.3 |
| r2 | 75.000 | d2 | 1.50 | n2 | 1.69895 | ν2 | 30.1 |
| r3 | 34.860 | d3 | 0.13 | | | | |
| r4 | 11.500 | d4 | 1.90 | n3 | 1.75500 | ν3 | 52.3 |
| r5 | 14.098 | d5 | 0.90 | n4 | 1.68893 | ν4 | 31.1 |
| r6 | 8.201 | d6 | 4.98 | | | | |
| r7 | ∞ (diaphragm) | d7 | 4.98 | | | | |
| r8 | −10.200 | d8 | 0.90 | n5 | 1.67270 | ν5 | 32.1 |
| r9 | −23.000 | d9 | 1.95 | n6 | 1.75500 | ν6 | 52.3 |
| r10 | −14.364 | d10 | 0.13 | | | | |
| r11 | −86.000 | d11 | 1.50 | n7 | 1.64769 | ν7 | 33.8 |
| r12 | −500.000 | d12 | 4.50 | nIV | 1.75500 | νIV | 52.3 |
| r13 | −20.058 | d13 | 25.808 | | | | |
| r14 | ∞ | d14 | 0.70 | n9 | 1.51633 | ν9 | 64.1 |
| r15 | ∞ | | | | | | |

The Table 2 indicates data in the second embodiment based on the numerical values of the present invention. These numerical values are based when aperture ratio is 1:4.0, half-angle of view is 20.7°, synthetized focal length of lens system is 40.10 mm, and magnification is 0.112.

Figure 1:
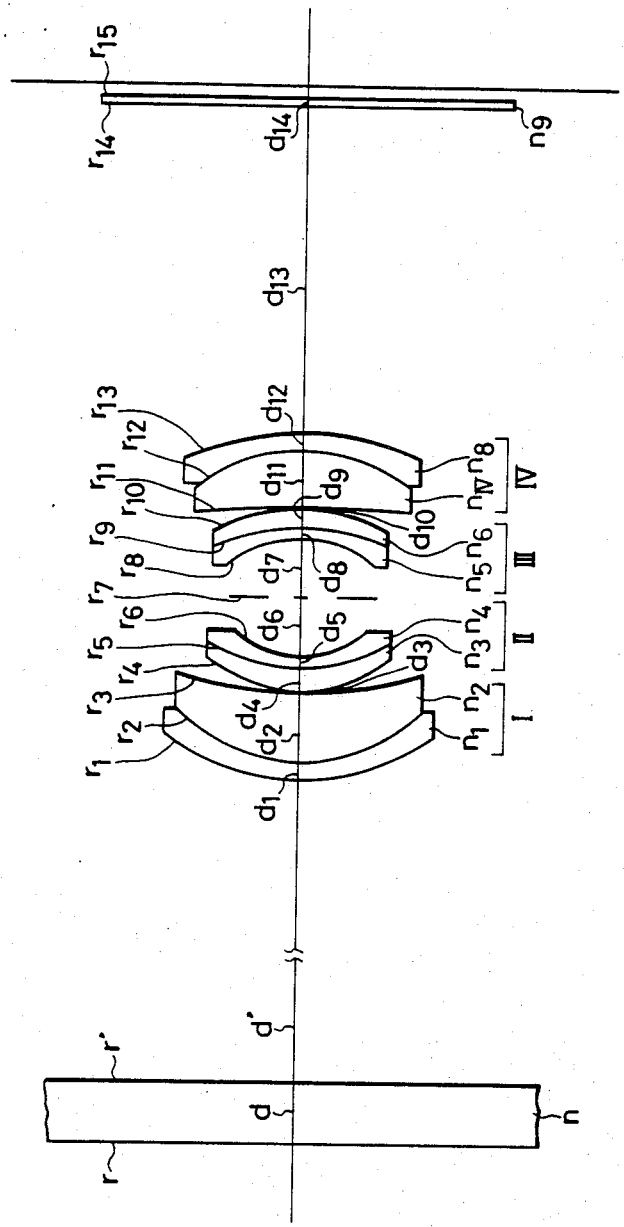
FIG. 1 is a sectional view of a lens system according to a first embodiment of the present invention.
Figure 2:
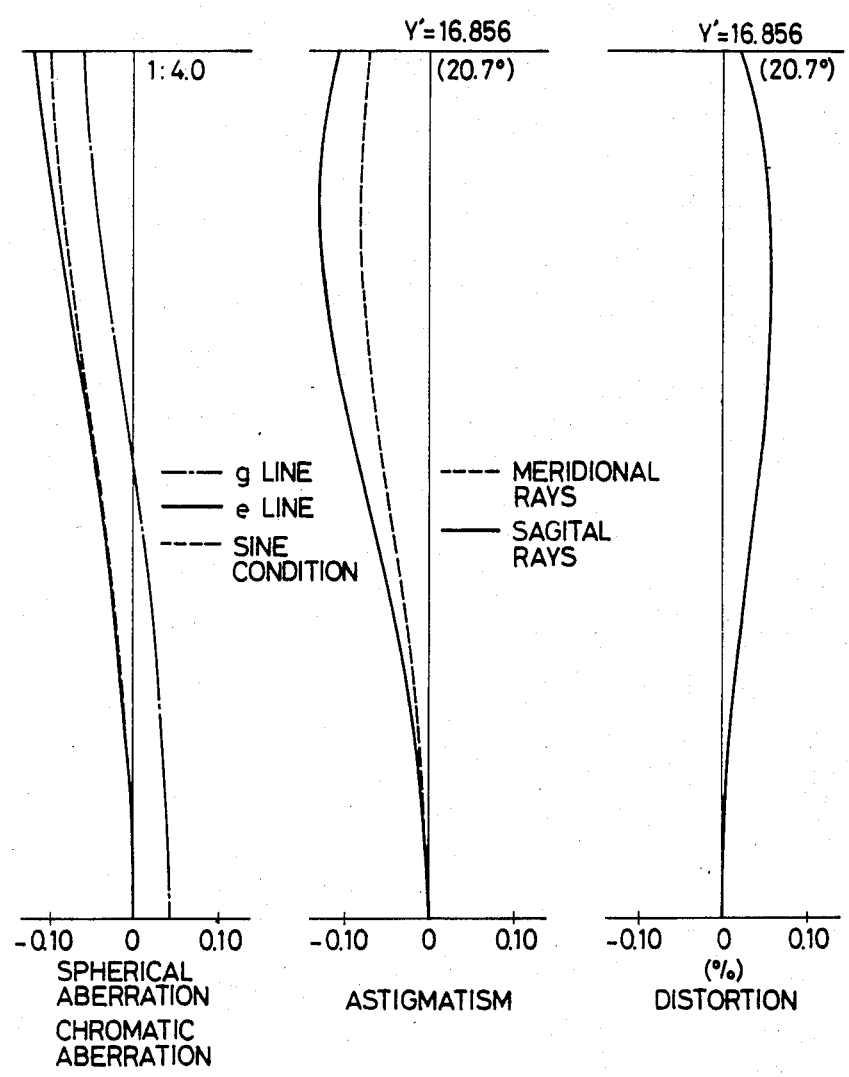
FIG. 2 is an aberration curve of the first embodiment, showing sphrical-chromatic aberration, astigmatism and distortion curves, as viewed from lefthand.
Figure 3:
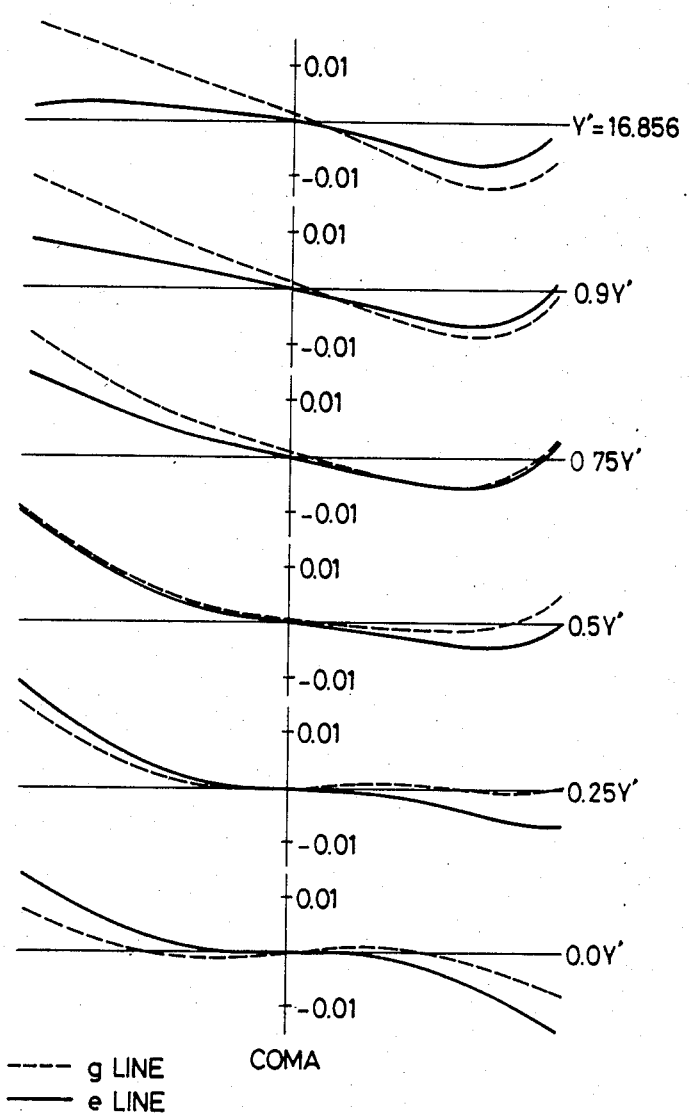
FIG. 3 is a comatic aberration curve.
Figure 4:
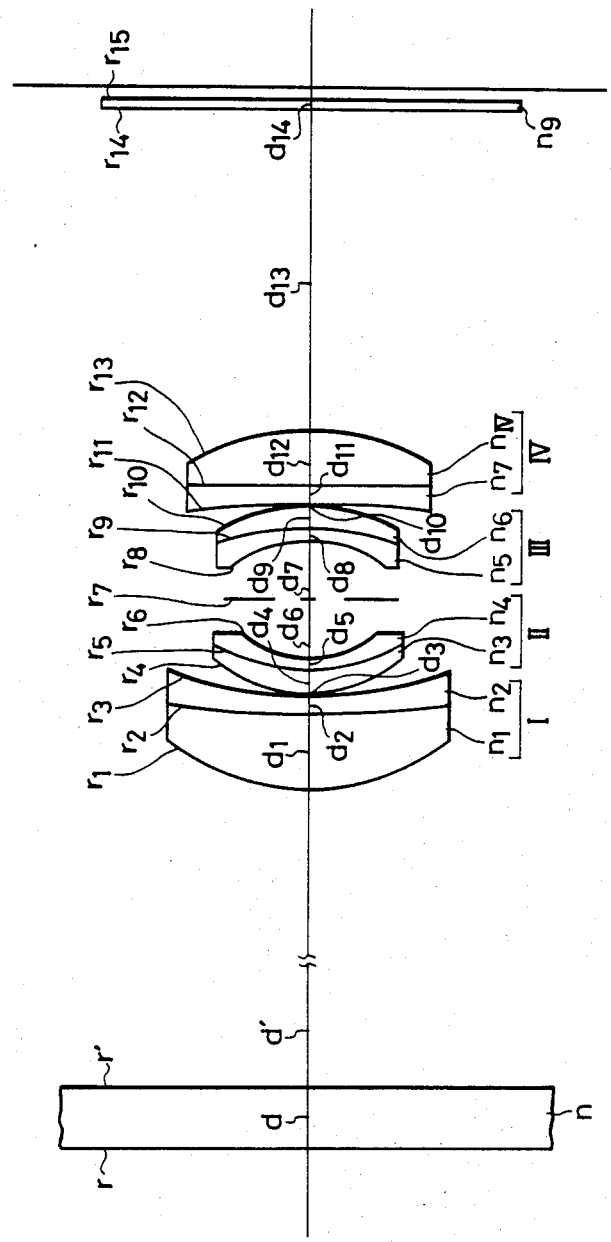
FIG. 4 is a sectional view of a lens system according to a second embodiment of the present invention.
Figure 5:
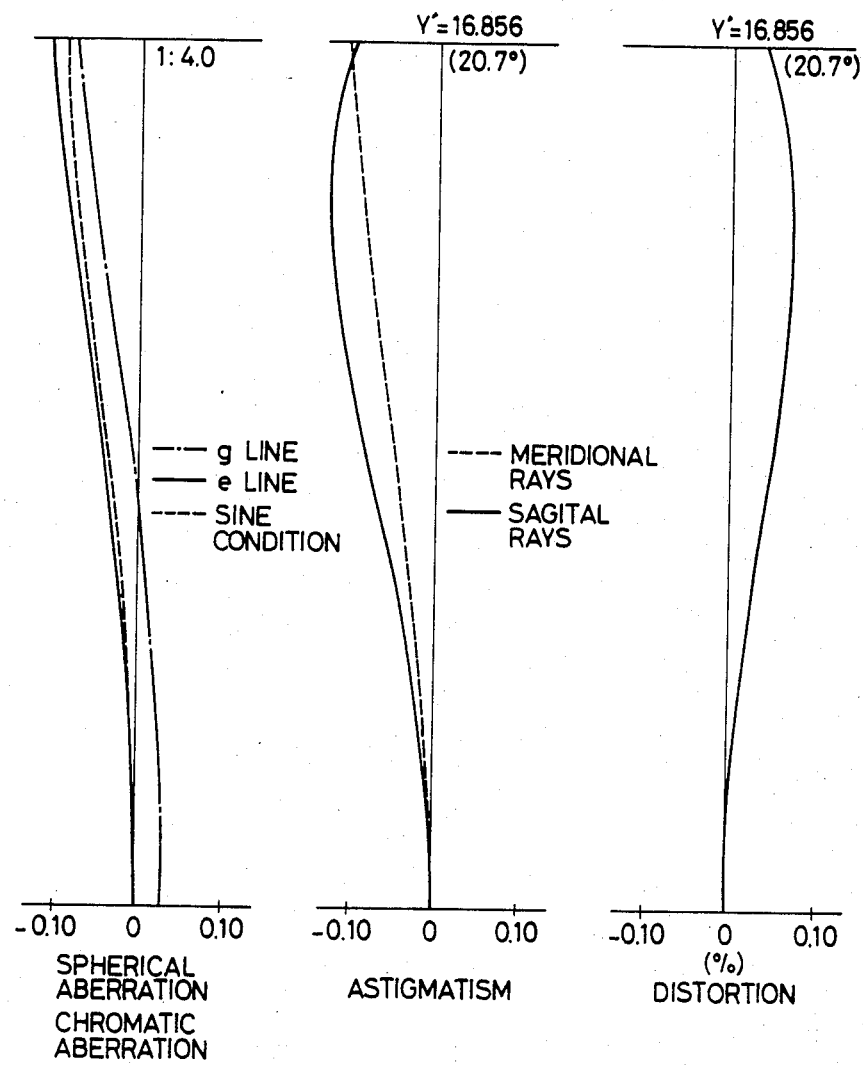
FIG. 5 is an aberration curve of a lens system according to the second embodiment, showing spherical aberration-chromatic aberration, astigmatism and distortion curves, as viewed from lefthand.

The first embodiment is different from the second embodiment in that as can be seen from FIGS. 1 and 4, the first group (the fourth group) in the first embodiment comprises a cemented lens comprising a first negative meniscus lens with a convex surface directed toward an object and a second positive meniscus lens with a convex surface directed toward an object whereas the first group (the fourth group) in the second embodiment comprises a cemented lens comprising a first positive meniscus lens with a convex surface directed toward an object and a second negative meniscus lens with a convex surface directed toward an object.

In the Gaussian lens according to the present invention, as can be seen from various aberration curves, the center is well balanced with the marginal portion, and various aberrations such as chromatic aberration and comatic aberration can be satisfactorily compensated for.

The present invention is not limited to the aforsaid specific embodiments but can be of course variously modified within the technical scope of the present invention.

What is claimed is:

1. A density Gaussian lens in the form of a symmetrical type lens comprising four groups including eight lenses, said four groups consisting of a first lens group which is a cemented lens comprising a negative meniscus lens with a convex surface directed toward an object and a positive meniscus lens with a convex surface directed toward an object, a second lens group which is a cemented lens comprising a third positive meniscus lens with a convex surface directed toward an object and a fourth negative meniscus lens with a convex surface directed toward an object, a third lens group which is a cemented lens comprising a fifth negative meniscus lens with a convex surface directed toward an image and a sixth positive meniscus lens with a convex surface directed toward an image, and a fourth lens group which is a cemented lens comprising a positive meniscus lens with a convex surface directed toward an image and a negative meniscus lens, said first lens group and fourth lens group and said second lens group and third lens group being arranged symmetrically around the diaphragm, said Gaussian lens being satisfied with the following conditional formula:

$$\frac{nI + n3 + n6 + nIV}{4} > 1.74 \tag{1}$$

$$\nu I, \nu 3, \nu 6, \nu IV > 48.0 \tag{2}$$

$$0.25f < r5 < 0.45f \tag{3}$$

$$0.35f < |r9| < 0.65f \tag{4}$$

$$d4 + d5, d8 + d9 < 0.075f \tag{5}$$

$$0.28 < \frac{d4 + d5}{d1 + d2} < 0.48$$

where nI, nIV are the refractive indices of the positive lenses of the first and fourth lens groups, respectively; n3, n6 are the refractive indices of the third and sixth lenses, respectively; νI, νIV are the Abbe numbers of the positive lenses of the first and fourth lens group, respectively, and ν3, and ν6 are the Abbe numbers of the third and sixth lenses, respectively, f is the synthesized focal length of the lens system, r5, r9 are the radii of curvature of the fifth and ninth surfaces, respectively, and d1, d2 . . . d12 are the distances between the lens surfaces.

2. The Gaussian lens according to claim 1 wherein said lens has the following data:

| r | | d | | n | | |
|---|---|---|---|---|---|---|
| r | ∞ | d | 5.00 | n | 1.51633 | ν 64.1 |
| r' | ∞ | d' | 375.952 | | | |
| r1 | 18.950 | d1 | 1.50 | n1 | 1.63980 | ν1 34.5 |
| r2 | 13.702 | d2 | 5.60 | nI | 1.75500 | νI 52.3 |
| r3 | 35.146 | d3 | 0.13 | | | |
| r4 | 11.298 | d4 | 1.80 | n3 | 1.77250 | ν3 49.6 |
| r5 | 13.560 | d5 | 0.90 | n4 | 1.71736 | ν4 29.5 |
| r6 | 8.129 | d6 | 4.90 | | | |
| r7 | ∞ (diaphragm) | d7 | 4.90 | | | |
| r8 | −10.382 | d8 | 0.90 | n5 | 1.63980 | ν5 34.5 |
| r9 | −17.918 | d9 | 1.60 | n6 | 1.75500 | ν6 52.3 |
| r10 | −14.613 | d10 | 0.13 | | | |
| r11 | −87.155 | d11 | 5.00 | nIV | 1.75500 | νIV 52.3 |
| r12 | −13.560 | d12 | 1.50 | n8 | 1.63980 | ν8 34.5 |
| r13 | −21.095 | d13 | 23.757 | | | |
| r14 | ∞ | d14 | 0.70 | n9 | 1.51633 | ν9 64.1 |
| r15 | ∞ | | | | | |

3. A density Gaussian lens in the form of a symmetrical type lens comprising four groups including eight lenses, said four groups consisting of a first lens group which is a cemented lens comprising a positive meniscus lens with a convex surface directed toward an object and a negative meniscus lens with a convex surface directed toward an object, a second lens group which is a cemented lens comprising a third positive meniscus lens with a convex surface directed toward an object and a fourth negative meniscus lens with a convex surface directed toward an object, a third lens group which is a cemented lens comprising a fifth negative meniscus lens with a convex surface directed toward an image and a sixth positive meniscus lens with a convex surface directed toward an image, and a fourth lens group which is a cemented lens comprising a negative meniscus lens with a convex surface directed toward an image and a positive meniscus lens, said first lens group and fourth lens group and said second lens group and third lens group being arranged symmetrically around the diaphragm, said Gaussian lens being satisfied with the following conditional formula:

$$\frac{nI + n3 + n6 + nIV}{4} > 1.74 \quad (1)$$

$$\nu I, \nu 3, \nu 6, \nu IV > 48.0 \quad (2)$$

$$0.25f < r5 < 0.45f \quad (3)$$

$$0.35f < |r9| < 0.65f$$

$$d4 + d5, d8 + d9 < 0.075f \quad (4)$$

$$0.28 < \frac{d4 + d5}{d1 + d2} < 0.48 \quad (5)$$

where nI, nIV are the refractive indices of the positive lenses of the first and fourth lens groups, respectively; n3, n6 are the refractive indices of the third and sixth lenses, respectively; νI, νIV are the Abbe numbers of the positive lenses of the first and fourth lens groups, respectively, and ν3, ν6 are the Abbe numbers of the third lens and sixth lens, respectively, f is the synthesized focal length of the lens system, r5, r9 are the radii of curvature of the fifth and ninth surfaces, respectively, and d1, d2 ... d12 are the distances between the lens surfaces.

4. The Gaussian lens according to claim 3 wherein said lens has the following data:

| r | | d | | n | | |
|---|---|---|---|---|---|---|
| r | ∞ | d | 5.00 | n | 1.51633 | ν 64.1 |
| r' | ∞ | d' | 374.918 | | | |
| r1 | 18.500 | d1 | 5.90 | nI | 1.75500 | νI 52.3 |
| r2 | 75.000 | d2 | 1.50 | n2 | 1.69895 | ν2 30.1 |
| r3 | 34.860 | d3 | 0.13 | | | |
| r4 | 11.500 | d4 | 1.90 | n3 | 1.75500 | ν3 52.3 |
| r5 | 14.098 | d5 | 0.90 | n4 | 1.68893 | ν4 31.1 |
| r6 | 8.201 | d6 | 4.98 | | | |
| r7 | ∞ (diaphragm) | d7 | 4.98 | | | |
| r8 | −10.200 | d8 | 0.90 | n5 | 1.67270 | ν5 32.1 |
| r9 | −23.000 | d9 | 1.95 | n6 | 1.75500 | ν6 52.3 |
| r10 | −14.364 | d10 | 0.13 | | | |
| r11 | −86.000 | d11 | 1.50 | n7 | 1.64769 | ν7 33.8 |
| r12 | −500.000 | d12 | 4.50 | nIV | 1.75500 | νIV 52.3 |
| r13 | −20.058 | d13 | 25.808 | | | |
| r14 | ∞ | d14 | 0.70 | n9 | 1.51633 | ν9 64.1 |
| r15 | ∞ | | | | | |

* * * * *